(12) United States Patent
Badding et al.

(10) Patent No.: US 6,623,881 B2
(45) Date of Patent: Sep. 23, 2003

(54) HIGH PERFORMANCE SOLID ELECTROLYTE FUEL CELLS

(75) Inventors: Michael E. Badding, Elmira, NY (US); Jacqueline L. Brown, Lindley, NY (US); Thomas D. Ketcham, Big Flats, NY (US); Dell J. St. Julien, Watkins Glen, NY (US); Raja R. Wusirika, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 198 days.

(21) Appl. No.: 09/858,124

(22) Filed: May 15, 2001

(65) Prior Publication Data

US 2001/0044041 A1 Nov. 22, 2001

Related U.S. Application Data

(60) Provisional application No. 60/205,273, filed on May 18, 2000.

(51) Int. Cl.[7] .............................. H01M 4/00; H01M 8/10
(52) U.S. Cl. .............................. 429/30; 429/27; 429/28
(58) Field of Search .............................. 429/30, 27, 28

(56) References Cited

U.S. PATENT DOCUMENTS

| | | | |
|---|---|---|---|
| 4,648,945 A | * | 3/1987 | Isenberg ..................... 205/122 |
| 5,089,455 A | | 2/1992 | Ketcham et al. |
| 5,190,834 A | * | 3/1993 | Kendall ....................... 429/31 |
| 5,273,837 A | | 12/1993 | Aitken et al. |
| 5,750,279 A | * | 5/1998 | Carolan et al. ................ 429/32 |
| 5,925,477 A | | 7/1999 | Ledjeff et al. |
| 6,183,897 B1 | | 2/2001 | Hartvigsen et al. |
| 6,187,157 B1 | * | 2/2001 | Chen et al. .................. 204/296 |

OTHER PUBLICATIONS

"High–Temperature Fuel Cells Part 2: The Solid Oxide Cell," Chemtech, 21:120–126 (1991).

Minh et al., Science and Technology of Ceramic Fuel Cells, Elsevier, p. 255 (1995).

* cited by examiner

*Primary Examiner*—Randy Gulakowski
*Assistant Examiner*—Donald V. Scaltrito
(74) *Attorney, Agent, or Firm*—Kees van der Sterre

(57) ABSTRACT

The present invention relates to a compliant fuel cell apparatus which includes arrays of positive air electrodes and negative fuel electrodes with via interconnections disposed on a thin compliant electrolyte sheet; optional electrode designs include symmetric electrodes comprising a conductive silver alloy metal phase and a thermally stabilizing ceramic phase, the latter providing low interface resistance and matching thermal properties, with the resulting fuel cells remaining sufficiently compliant to demonstrate good resistance to thermal shock damage.

25 Claims, 3 Drawing Sheets

HIGH PERFORMANCE SOLID ELECTROLYTE FUEL CELLS

This application claims the benefit of U.S. Provisional Application No. 60/205,273, filed May 18, 2000, entitled "High Performance Solid Electrolyte Fuel Cells with Silver Alloy Electrodes", by Badding et al.

BACKGROUND OF THE INVENTION

The present invention relates to an apparatus, such as a solid electrolyte fuel cell, incorporating compliant electrode/electrolyte structures that include opposing electrodes disposed on and electrically interconnected through a compliant electrolyte sheet, and a method of making such structures and apparatus.

The use of solid electrolyte materials for fuel cells and oxygen pumps has been the subject of a considerable amount of research for many years. The typical essential components of a solid oxide fuel cell ("SOFC") include a dense, oxygen-ion-conducting electrolyte sandwiched between porous, conducting metal, cermet or ceramic electrodes. Electrical current is generated in such cells by the oxidation, at the anode, of a fuel material, such as hydrogen, which reacts with oxygen ions conducted through the electrolyte from the cathode.

Practical power generation units will typically include multiple fuel cells of such configuration interconnected in series or parallel with electronically conductive ceramic, cermet, or metal interconnect materials. At the present time, the materials of choice for such devices include yttria-($Y_2O_3$) stabilized zirconia ($ZrO_2$) for the electrolyte, nickel-$ZrO_2$ cermet for the anode material, strontium-doped lanthanum manganite ($LaMnO_3$) for the cathode, and metals, especially Cr/Fe alloys and Ni alloys, intermetallics, and Sr or Ba doped $LaCrO_3$, for interconnect structures. Alternative oxygen ion conductors are known. At sufficient temperatures (e.g., 600° C. or above), zirconia electrolytes can exhibit good ionic conductivity but low electronic conductivity.

Several different designs for solid oxide fuel cells have been developed, including, for example, a supported tubular design, a segmented cell-in-series design, a monolithic design, and a flat plate design. All of these designs are documented in the literature, with one recent description in Minh, "High-Temperature Fuel Cells Part 2: The Solid Oxide Cell," *Chemtech.*, 21:120–126 (1991).

The tubular design comprises a closed-end porous zirconia tube exteriorly coated with electrode and electrolyte layers. The performance of this design is somewhat limited by the need to diffuse the oxidant through the porous tube. Westinghouse has numerous U.S. patents describing fuel cell elements that have a porous zirconia or lanthanum strontium manganite cathode support tube with a zirconia electrolyte membrane and a lanthanum chromate interconnect traversing the thickness of the zirconia electrolyte. The anode is coated onto the electrolyte to form a working fuel cell tri-layer, containing an electrolyte membrane, on top of an integral porous cathode support or porous cathode, on a porous zirconia support. Segmented designs proposed since the early 1960s (Minh et al., *Science and Technology of Ceramic Fuel Cells*, Elsevier, p. 255 (1995)), consist of cells arranged in a thin banded structure on a support, or as self-supporting structures as in the bell-and-spigot design.

A number of planar designs have been described which make use of free-standing electrolyte membranes. A cell is formed by applying single electrodes to each side of an electrolyte sheet to provide an electrode-electrolyte-electrode laminate. Typically these single cells are then stacked and connected in series to build voltage. Monolithic designs, which characteristically have a multi-celled or "honeycomb" type of structure, offer the advantages of high cell density and high oxygen conductivity. The cells are defined by combinations of corrugated sheets and flat sheets incorporating the various electrode, conductive interconnect, and electrolyte layers, with typical cell spacings of 1–2 mm for gas delivery channels.

U.S. Pat. No. 5,273,837 to Aitken et al. covers sintered electrolyte compositions in thin sheet form for thermal shock resistant fuel cells. It describes an improved method for making a compliant electrolyte structure wherein a precursor sheet, containing powdered ceramic and binder, is pre-sintered to provide a thin flexible sintered polycrystalline electrolyte sheet. Additional components of the fuel cell circuit are bonded onto that pre-sintered sheet including metal, ceramic, or cermet current conductors bonded directly to the sheet as also described in U.S. Pat. No. 5,089,455 to Ketcham et al. U.S. Pat. No. 5,273,837 to Aitken et al. shows a design where the cathodes and anodes of adjacent sheets of electrolyte face each other and where the cells are not connected with a thick interconnect/separator in the hot zone of the fuel cell manifold. These thin flexible sintered electrolyte-containing devices are superior due to the low ohmic loss through the thin electrolyte as well as to their flexibility and robustness in the sintered state.

Another approach to the construction of an electrochemical cell is disclosed in U.S. Pat. No. 5,190,834 Kendall. The electrode-electrolyte assembly in that patent comprises electrodes disposed on a composite electrolyte membrane formed of parallel striations or stripes of interconnect materials bonded to parallel bands of electrolyte material. Interconnects of lanthanum cobaltate or lanthanum chromite bonded to a yttria stabilized electrolyte are suggested. Unfortunately, the electrolyte/interconnect junctions in this design are sufficiently weak that a usefully compliant electrode/electrolyte structure cannot be obtained.

The internal circuit of the fuel cell circuit consists of the electrolyte, electrodes, and current conductors. The performance of a fuel cell, i.e., the current carrying capacity and hence the overall efficiency of the cell, is limited by its internal resistance, the maximum power for any power supply being given by $P_{max}=V^2/4R_{internal}$. Internal resistance is the sum of several components including the electrode ohmic resistance, the electrolyte resistance, the electrode/electrolyte interfacial resistance to charge transfer reaction, and the current conductor resistance. The interfacial resistance to charge transfer depends mainly on the electrochemical behavior and physical and chemical nature of the electrode.

Precious or "noble" metals such as gold, silver, platinum, palladium, rhodium etc. have been suggested as candidates for electrode materials in high temperature fuel cells, silver and its alloys, including silver-palladium, being amongst the best electrical conductors known. One disadvantage of silver as an electrode material, however, is its high volatility at temperatures over about 800° C. Fuel cell operation at temperatures in the neighborhood of 700° C. would significantly reduce metal volatilization, and should also allow the use of relatively inexpensive stainless steel components for the fabrication of manifold and other mechanical elements of the cells. Also, the volatility of precious metal electrode materials such as silver can be further reduced by introducing them in admixture with refractory ceramic fillers as cermet electrodes. Silver/yttria-doped zirconia cermet cathodes, for example, are advantageous due to high electronic conductivity and good catalytic properties, and can be made economically in thin film form by continuous magnetron sputtering.

The present invention is directed to providing an improved fuel cell construction, applicable to any of a variety of planar fuel cell designs, which avoids many of the difficulties of fuel cell manufacture while providing a cell of improved physical, thermal, and electrical properties.

SUMMARY OF THE INVENTION

In an important aspect, the present invention is based on a thin, compliant electrode/electrolyte structure for a solid oxide fuel cell that offers improved cell design flexibility while retaining high strength, mechanical integrity, and resistance to thermal degradation from temperature cycling and thermal shock. The electrode/electrolyte structure of the invention comprises a thin flexible solid oxide electrolyte sheet incorporating a plurality of positive air and negative fuel electrodes bonded to opposing sides of the sheet. Thus the electrodes do not form continuous layers on the electrolyte sheets, but instead define multiple discrete regions, typical bands or other segments. The segments are then electrically interconnected in series, parallel, or a combination thereof by means of electrical conductors in contact therewith that extend through vias in the electrolyte sheet. The vias are filled with electronically conductive materials, preferably of lower electrical resistance than the electrodes.

Electronic conductor materials suitable for forming the electrical interconnections through the vias are may be metallic, ceramic, or cermet electronic conductors. Metallic conductors are preferred for their higher conductivity and better sintering characteristics, examples of suitable conductors including precious or semi-precious metals or their alloys. For the purpose of the present description precious metals include metals selected from the group consisting of silver, gold, platinum, palladium and rhodium.

In another aspect, the invention resides in a solid oxide fuel cell incorporating one or more compliant electrode/electrolyte structures such as above described. The electrodes in these cells are attached to opposing sides of the electrolyte structure in configurations effective to provide multiple power-generating segments within the fuel cell that can be connected in various groupings to provide electrical energy at predetermined levels of voltage or current. Where multiple electrical series connections between the electrodes are employed, fuel cells offering higher voltage outputs for specific applications are conveniently provided.

The electrode/electrolyte structures supporting the multiple electrode segments may easily be combined to provide fuel cell stacks wherein the electrode/electrolyte structures are disposed as layers. The layering is desirably carried out so that the fuel or air electrodes of adjacent structures face each other in arrangements forming reservoirs for air or fuel between the facing layers, these reservoirs conveniently being supplied by fuel or air manifolds connecting therewith. The electrolyte structures are effective to maintain air-fuel reservoir separation without the use of additional gas separators. Conventional interconnecting stack elements may be used to connect multiple electrode/electrolyte structures; electrode interconnections are provided by vias in the electrolyte structure.

Still another aspect of the present invention relates to a method of making a compliant electrolyte/electrode element for a fuel cell apparatus. In accordance with that method a compliant ceramic electrolyte sheet is selected and electrode layers comprising multiple electrode segments separated by gaps therebetween are applied to opposing sides of the sheet. Cathode segments are deposited on one side of the sheet and anode segments are deposited in opposition to the cathode segments on the other side of the sheet to provide the basic components of a series of electrochemical cells.

A plurality of vias is formed in the sheet, these typically being placed at sheet locations not covered by the anode and cathode segments. Electrically conducting materials are then applied to the sheet to fill the vias and to provide electrical connections between the cathodes and the anodes. Each electrical conductor traverses one or more of the vias and is arranged to be in contact with a cathode segment on one side of the sheet and an opposing anode segment on another side of the sheet.

Appropriate ceramic or cermet components may be employed to form the electrodes of the present invention, these being selected to minimize electrode interface resistance and improve electrode durability. Electrodes so comprised can display exceptionally low ohmic and interfacial resistance for both the air-side (cathode) and fuel side (anode) electrodes. Moreover, some silver-based electrode compositions can impart excellent tolerance towards leakage of fuel into the air chamber or air into the fuel chamber. This can be advantageous since complete avoidance of leakage, whether from pinholes through the electrolyte or egress through seals, is difficult to achieve.

Fuel cell stack designs incorporating thin, compliant, self-supporting electrolyte sheets supporting thin electrode segments as above described exhibit high active element flexibility and compliance, and are therefore highly thermal shock tolerant. Further, combining the compliant electrolyte sheets with symmetric electrodes having similar thermal expansion behavior can improve stress field symmetry in the sheets, giving rise to a flat composite body well suited for use in fuel cell stacks.

DETAILED DESCRIPTION

The electrical and mechanical performance of fuel cell devices depends on a number of geometric design factors, material choices, and processes used for their construction, but the limitations imposed by the difficulty of providing thermally durable interconnections between stacked elements of the fuel cells have remained significant. By providing a low resistance method for connecting arrays of cells, the invention overcomes many of the performance limitations presented by prior art cell interconnect arrangements.

Connecting plates are needed for building voltage in fuel cell devices. High voltages are needed to reduce the ohmic losses for current leads and for efficient power electronics. Thick, rigid connections inhibit electrolyte flexure and therefore act to locally increase the stress in an electrolyte under a mechanical load resulting in a lowered thermal stress tolerance. Thin electrical connections are practical at lower current, where the IR loss is minimized. By building voltage with multiple cells, the diameter of the current carrying leads taking power off the multi-cell electrolyte can be reduced dramatically. By having the current path go through a very thin electrolyte the resistance of the current bus is very low.

Vias enable both positive and negative current leads from the sheet to be attached on the fuel side and thus allow the leads to be made of nickel or iron alloys as well as precious metal alloys. The low current and high voltage created by interconnected anode/cathode cell pairs on the electrolyte sheets allows connection of the individual sheets outside of the fuel cell hot section, thus eliminating the sheet-to-sheet hot section interconnect of standard designs. Because the multi-cell sheet can have anodes of one sheet facing anodes of another, the additional fuel-air separators can be eliminated along with the hot section interconnects, reducing the amount of material and cost of the fuel cells proportionately.

The flexibility of an electrolyte sheet with properly formed vias provides significant benefits in terms of thermal shock resistance and thermal strain tolerance. In a typical solid electrolyte fuel cells, which typically comprise electrode and/or electrolyte components equaling or significantly exceeding about 150 microns in thickness, "flexibility" is limited to a bend radius in excess of 30 cm or more. It is common for thermal gradients in excess of 100° C. to exist across a typical 10 cm planar cell. This can produce stress that limits the practical size of rigid planar fuel cells. With flexible structures provided in accordance with the invention such stress can be substantially relieved by bending, and if desired, controlled curvature can be designed into the structures to further reduce thermal stress and increase thermal shock resistance. In addition, the thermal expansions of the electrolytes and electrodes can be chosen so as to yield preferred flexure modes in order to further reduce thermal stress.

Figure 1A:
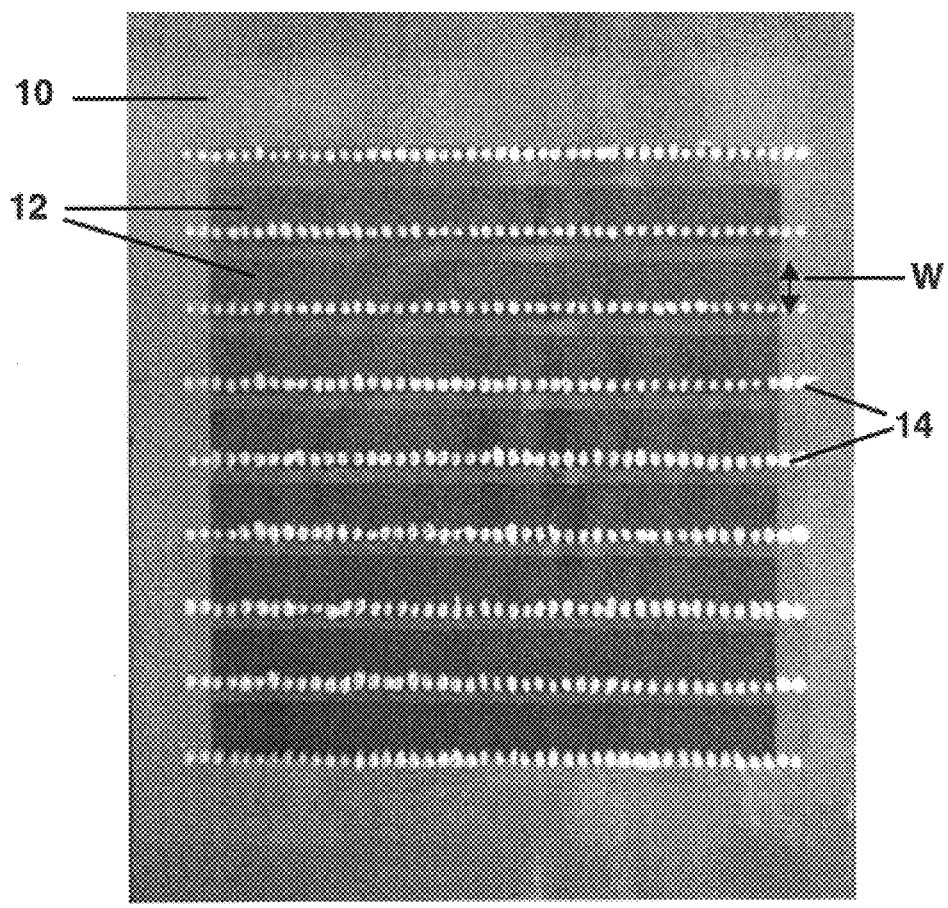
FIGS. 1A and 1B show a cell module with eight cells connected in series through interconnect vias.
Figure 1B:
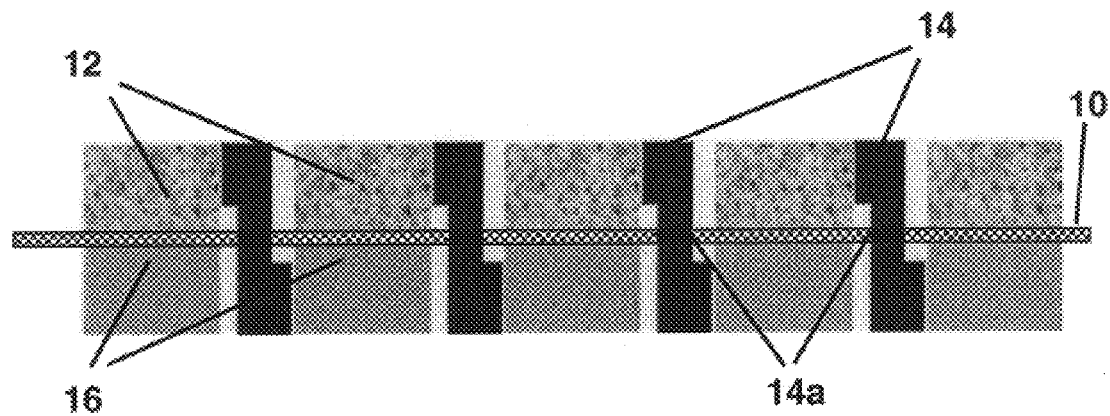

A preferred embodiment of a compliant electrode/electrolyte structure for use in a fuel cell is shown in FIGS. 1A–1B of the drawing. In particular, FIGS. 1A and 1B show two views of a thin flexible self-supporting zirconia-3 mole % yttria electrolyte sheet supporting electrodes in the form of rectangular segments connected through small via holes in the sheet. The design is notable for the absence of expensive interconnect plates.

In the top plan view of the structure shown in FIG. 1A, self-supporting 3YSZ sheet 10 is provided with a plurality of electrodes 12 on its top surface, each electrode having a width W of about 8 mm. Electrical contact with these electrodes is made through rows of interconnects 14 along the lower edges of each electrode in the figure.

FIG. 1B is a schematic elevational cross-sectional view of a five-cell section of the structure shown in top plan view in FIG. 1A. FIG. 1B details the manner in which the interconnects 14 traverse the electrolyte sheet 10 through vias 14a in the sheet, and how those interconnects electrically connect the electrochemical cells formed by the opposing electrode (cathode) segments 12 on the top of sheet 10 and anode segments 16 on the bottom of sheet 10 into a series-connected cell array. As implemented in FIGS. 1A–B, current is collected at the edges of the electrodes; therefore the ohmic resistance of the electrodes should be minimized for best performance.

These electrolyte/electrode designs permit the construction of fuel cell assemblies with low total internal resistance. Single cell internal resistances below 1 ohm-cm$^2$ are readily obtained, and with appropriate selection of electrolyte and electrode materials internal resistances below 0.4 ohm-cm$^2$, or even below 0.1 ohm-cm$^2$, may be provided.

The electrolyte resistance is a strong function of temperature. For some applications fuel cell operation at less than 850° C., or even less than 725° C., is preferred. This is simply because lower temperatures make it possible to use a wider range of materials, such as stainless steels and silver alloys, for electrodes, vias, and fuel or oxidant conduits or enclosures for the cells. Maintaining total internal resistances at these temperatures at values less than 1 ohm-cm$^2$, or even below 0.6 ohm cm$^2$ or 0.1 ohm-cm$^2$, is particularly desirable. To achieve these results the resistance of the electrolyte sheet must be low.

The electrolyte resistance depends on material properties and geometry and is proportional to the thickness of the electrolyte. In order to operate a fuel cell at less than 850° C., or more preferably less than 725° C., the electrolyte must be as thin as is practical. Using a thin flexible electrolyte, devices operating effectively even at temperatures between 600° C. and 700° C. can be envisioned. In order to employ a thin electrolyte, it must be strong enough to enable handling. The choice of electrolyte is therefore important.

Desirably, the electrolyte sheets employed in the compliant structures and fuel cells of the invention are maintained below 45 microns in thickness, preferably below 30 microns in thickness, and most preferably in the range of 5–20 microns in thickness. The use of a thin flexible polycrystalline ceramic electrolyte in the present invention offers enhanced thermal shock resistance and electrochemical performance, and provides a durable free-standing electrolyte layer to which the electrodes may easily be applied. U.S. Pat. No. 5,089,455 to Ketcham et al., which is hereby incorporated by reference, describes the formulation and manufacture of free-standing thin electrolytes of this type, and that patent may be referred to for additional detailed description of such materials. Examples of suitable compositions for such electrolytes are selected from the group consisting of partially stabilized zirconias or stabilized zirconias that are doped with a stabilizing additive selected from the group consisting of the oxides of Y, Ce, Ca, Mg, Sc, Nd, Sm, Eu, Gd, Tb, Dy, Ho, Er, Tm, Yb, Lu, In, Ti, Sn, Nb, Ta, Mo, and W and mixtures thereof.

The use of electrolyte sheets in these thickness ranges is in contrast to tubular designs, where the electrolyte is supported on porous tubes on the order of 1 mm thick, and most previous planar cell designs wherein the electrolytes are typically 50 to 200 microns thick. Utilizing thin, free-standing electrolytes such as above described can provide electrode/electrolyte structures for fuel cells having a total thickness of less than 150 microns, the thinner electrolytes producing lower resistive losses, enhanced mechanical properties, and better utilization of raw materials.

Due to the elastic compliance of the thin ceramic electrolyte sheets, such electrolytes have the advantage of thermal stress relief through buckling, imparting high thermal shock resistance. For example, a zirconia electrolyte with 2 to 6 mole % yttria contains at least some tetragonal phase which imparts transformational toughening to the electrolyte. This toughening can more than triple the strength over fully stabilized zirconia with 8 or 10% yttria. However, compositions with 6 to 10 mole % yttria exhibit a higher ionic conductivity. Therefore, electrolyte sheet compositions containing 3 to 10 mole % $Y_2O_3$ in $ZrO_2$, or more preferably 3 to 6 mole % $Y_2O_3$—$ZrO_2$, offer the best combination of properties for this application.

The vias traversing the electrolyte sheets are arranged to make the best use of electrolyte surface area and to ensure low resistance and high current carrying capacity. One useful arrangement is to place the via holes in rows spaced so as to allow electrodes to be printed between the rows. The spacing of the rows and the distance between vias in the same row are variables that impact the electrical properties of the fuel cell circuit. Arranging the via holes in a non-linear array reduces the tendency for the device to bend along the vias. A single line of lower stiffness would encourage bending along that line and result in greater stress to the electrolyte than would a more uniform bending. Also, the via patterns should not extend to the edge of the electrolyte sheet since the edge area is normally used for mounting the structure in the fuel cells and high edge strength is needed for mounting purposes.

Small via holes are particularly useful since utilization of the electrolyte surface area depends on the spacing of the electrodes. Areas are inactive which have no electrodes or one electrode, or which are used for vias. The percentage of the electrolyte that is active is important in determining both the size and the cost of the device; smaller vias make it easier to decrease the spacing between electrodes and thus increase the active area.

The aspect ratio of the vias, diameter to length, determines the difficulty in filling. Vias of greater than around 750 microns are difficult to fill; therefore vias of less than 500 microns are generally used, with vias below 250 microns or even below 125 microns being preferred. Via holes 25 microns or less in diameter with aspect ratios near 1 are suitable; on the other hand vias with aspect ratios of less than 0.1 are difficult to fill and generally avoided. Pre-filling of the vias with metals such as Pt, Pt—Pd, and Ir is possible, but the electrolyte sheet should be sintered before such prefilling is attempted.

Since the via holes can act as stress intensifiers in the electrolyte sheet, cylindrical holes having a lower impact on sheet strength than vias with sharp outline features are preferred. Also, since thermal expansion differences between the electrolyte and the via filling material can lead to stress fields with both radial and circumferential components, oblong, elliptical, or rectangular via holes that tend to develop enhanced stresses in the direction of elongation are to be avoided.

The minimum size and number of vias is determined, in part, by the maximum allowable current density for the via material and by the resistance of the vias including entrance and exit effects. Above the maximum current, the via material may fail due to local heating, atomic migration, or volatilization. The maximum current generally is less than 50,000 $A/cm^2$ and can be less than 1,000 $A/cm^2$. The preferred operating condition is one with less than the maximum limit by a factor greater than about 5.

Via resistance is the resistance between cells which are connected in series and takes into account the resistance of the via itself and the contacts to that via. Resistance can be reduced by contacts which extend beyond the via hole, and by closely spaced vias as well as increased via conductivity. For the preferred electrolyte thicknesses of between 5 and 45 microns, the resistance of the via can be very small because of the slight thickness. Proper selection of via diameter and spacing can reduce the via contribution to cell resistance to less than 0.1 ohm-$cm^2$, or even less than 0.02 ohm-$cm^2$.

The effect of via conductivity on cell resistance may vary considerably due to the large variations in electrical resistivity among the candidate filler materials. Precious metal fillers may have resistivities on the order 10-5 ohm-cm, whereas lanthanum strontium chromate fillers have resistivities approximately 1000 times higher than the precious metals. In addition, ceramic fillers are difficult to sinter after they have been introduced into the vias.

For these reasons, the use of precious or semi-precious metals or cermets as via fillers and electrode interconnects is often preferred. Most preferred are metals, metal alloys, and cermets comprising one or more metals selected from the group consisting of silver, gold, platinum, rhodium and palladium. Co-firing of the electrolyte with vias that are pre-filled with refractory noble metals such as Pt, Pd, Rh, Ir and alloys thereof is possible, however it is preferred to at least partially sinter the electrolyte before pre-filling to avoid undesirable deformation of the via. In any case, the best selection of via fillers and/or interconnect materials to be used for any particular composition, size, or spacing of electrodes and via holes can readily be determined by routine experiment.

Leakage currents between the interconnected elements of the electrode/electrolyte structures of the invention can arise due to the electrical and ionic conductivity of the electrolyte, the amount of such currents being inversely proportional to the gap distance between components of different electrical potential in the cells. In general gaps of 10 or more times the electrolyte thickness between the filled vias and adjacent conductive components differing electrical potential from each other can prevent such leakage currents from becoming excessive.

Small, discrete, conductor-filled vias help limit leakage effects provided the electrodes are printed so as to not significantly overlap the vias; the via material can then be applied so as to extend towards the electrode and bridge the gap between via hole and electrode without creating significant areas for leakage. Dense via materials also help to seal the electrode under the via so as to limit the ionic conduction.

Via effectiveness of course depends on the ability to get electricity into and out of it, as well as through it. A current bottleneck can be caused by insufficient contact area between the electrode and the via, leading to a hot spot in the via or electrode materials. The area required for good contact depends on the via filling material, the geometry of the via hole, and the geometry of overlap between the via and the electrode. A large contact area with essentially uniform electrical potential is desired in order to limit current focusing.

There are several possible geometries for contact between the via and the electrodes. When the electrode has a lower current carrying capacity than the via material then the maximum current density can be limited by the electrode at the interface with the via. If the vias are terminated flush with the surface of the electrolyte, then it is necessary to print some of the electrode material over the via hole area in order to make contact with the electrodes over the entire via area. Maximizing contact area between the electrode and the via material is achieved by extending the via material beyond the via hole itself and thus providing a larger surface over which to make contact.

The via material may extend beyond the via and form a cylindrical, hemispherical, or elipsoidal pad on top of the electrolyte, electrode, and via hole. Mounding of the via into an approximately hemispherical shape above the via hole will increase the contact area slightly, while extending the via material in a disk or other pattern on the surface of the electrode and/or electrolyte yields a greater improvement and has the added benefits of strengthening the device and reducing the probability of gas leakage. Extending the via material beyond the area just above the via hole can also provide mechanical advantages, since an area of compression isolating electrolyte sheet defects at via hole edges is thereby provided and the probability of gas leakage through the via is reduced. Of course the via material selected should not have open porosity that would permit cross-leakage of the fuel and oxidant gases present in the cell.

In addition to securing electronic interconnection the via holes provided in the electrolyte sheets can also be used for attaching electrical components such as lead wires to the electrodes or electrolyte. Wires can be inserted through the holes and bonded in place. Lead wires can be used to carry the current generated by the device to an external circuit or to connect one fuel cell component or fuel cell circuit to another. For example, the leads can be used to connect components on one side of the cell, such as cathodes with components on the opposite side of the cell, such as anodes or current conductors.

A particular advantage of precious metals as via filler materials is their ability to deform on heating, thereby limiting processing and operating stress on the electrolyte sheets. This enables the use of thinner electrolyte sheets, with correspondingly reduced internal cell resistance due to shorter current path lengths through the vias, the net result being that the cells can operate efficiently at relatively low temperatures, e.g., less than 750° C. At temperatures in this range metallic via materials of platinum, palladium, gold, silver and their alloys, as well as cermet materials comprising these metals or alloys in combination with zirconia, chromia, alumina, titania or even perovskites such as lanthanum strontium chromate, can be considered. Especially preferred via fillers for low temperature cell operation are alloys of silver and palladium, and cermets containing them. The combination of thin flexible electrolytes and silver alloy filled vias in these designs can reduce single-cell ohmic resistance, including electrode, electrolyte and via ohmic resistance, to less than 0.2 ohm-cm$^2$, or even less than 0.1 ohm-cm$^2$, at temperatures below 750° C.

The active area of the electrode/electrolyte structure is only that area of the electrolyte sheet covered by opposing electrode layers. The sizes and shapes of the electrodes are generally selected to maximize the active area, but within the limitations imposed by electrical leakage considerations and interconnect and via space requirements.

The ohmic resistance of the electrodes provided on the electrolyte sheets is determined by the resistivity of the electrode, by its thickness, and by the length of the current path through the electrode. As is known, the resistance for an electrode, $R_{el}$ is equal to $\rho l^2/2t_{el}w$ and the associated voltage drop, $V_{el}$ is given by $V_{el}=J\rho l^2/2t_{el}$, where J is the current density, $\rho$ is the resistivity of the electrode plus optional grid, l is the length of the current path, $t_{el}$ is the thickness of the electrode, and w is the width of the electrode.

In some cell designs, an extra row of via holes may be used to allow both anode and cathode lead connections to be taken off the same side of the electrolyte. For example, an extra via row located next to the cathode of the first cell in a series group may be used to allow the cathode-side lead to be taken off the anode side—allowing both connections to be made with lead material stable in a reducing environment, such as ferritic steel or nickel metal.

The resistivity of the electrode material limits the useful current path length through the electrodes. It is preferred that the electrode ohmic resistance be no greater than 0.4 ohm-cm$^2$, more preferred that it be less than 0.2 ohm-cm$^2$ and most preferred that it be less than 0.1 ohm-cm$^2$. For metal or cermet electrodes, such as Ni alloy anodes and precious metal electrodes, the electrode resistivity can be quite low. The electrical resistivities of the precious metals such as silver, palladium, platinum, and gold are on the order of $10^{-5}$ to $10^{-6}$ ohm-cm. These values permit electrode thicknesses to be reduced to between 0.1 and 50 microns, for example between 1 and 20 microns, without sacrificing performance.

With more conventional perovskite-type electrode materials such as $La_{0.85}Sr_{0.15}MnO_3$, or other manganites, electrode resistivity is typically about $10^{-2}$ ohm-cm, or essentially 3 orders of magnitude higher than the resistivities of precious metal-containing electrodes. In these cases the electrode designs generally involve smaller electrodes with shorter current path lengths (as low as 2 mm), higher electrode thicknesses, (>20 microns), and/or highly conductive current collectors in contact with the electrodes. Electrodes less than around 20 microns in thickness, however, are generally preferred for minimizing material usage and enhancing the flexibility and thermal shock resistance of the electrode/electrolyte structure.

In some embodiments of the invention the electrodes may be formed of highly conductive but relatively refractory metal alloys such as silver alloys. Examples of specific alloy electrode compositions of this type include silver alloys selected from the group consisting of silver-palladium, silver-platinum, silver-gold and silver-nickel, with the most preferred alloy being a silver-palladium alloy. Silver palladium is particularly preferred for its refractoriness, and also because its thermal expansion coefficient is more closely matched to zirconia than most other silver alloys.

Stress at the via metal/electrolyte interface region may further be reduced by utilizing alloys with nearly the same thermal expansion coefficient as the electrolyte. For example, alloys of platinum (CTE~9 ppm/C) and gold (CTE~14 ppm/C) with palladium (CTE~1 ppm/C) added for improved adherence are desirable for matching electrolytes of zirconia-3 mole % yttria (CTE~11 ppm/C).

Also useful as electrode materials are cermet materials comprising these metals or metal alloys in combination with a polycrystalline ceramic filler phase. Preferred polycrystalline ceramics for this use include stabilized zirconia, partially stabilized zirconia, stabilized hafnia, partially stabilized hafnia, mixtures of zirconia and hafnia, ceria with zirconia, bismuth with zirconia, gadolinium, and germanium. The most preferred ceramic is stabilized zirconia, examples of which include zirconia doped with a dopant selected from the group consisting of yttria ($Y_2O_3$), ceria, Sm, Sc, Ca, Mg, Eu, Gd, Ho, W, Y, Nb, Th, and mixtures thereof. Any of the well known alkaline earth oxide and rare earth oxide stabilizers may be present.

The principal function of the ceramic component in cermet electrodes is to reduce grain growth of the metal to improve microstructural stability. For this purpose, cermet electrodes may usefully comprise from about 1 to about 50% by weight of ceramic components, with the remainder of the electrodes being made up of the conductive metal phase.

The stability of silver alloys in both oxidizing and reducing conditions can impart a durability advantage to a cell design since air or fuel leakage from one reservoir to another is less likely to degrade the electrodes. Other common anode metals, such as nickel, are less resistant to oxidation in the case of air or oxygen leakage and thus require more attention to fuel and air reservoir integrity in the cell design.

With a flexible electrolyte, an additional advantage can be secured if the thermal expansions of the anode and cathode can be maintained at similar levels. This is because expansion stress field symmetry produces a flat composite body, and maintaining an overall planar body is important for low cost fuel cell stack fabrication. One approach for achieving this result is to employ a common base electrode composition, e.g., a silver-palladium alloy/polycrystalline zirconia cermet, for both the anode and the cathode, although in that case the anode (negative fuel electrode) will generally include additives to improve its catalytic activity toward hydrogen dissociation. For example, such anodes can be infiltrated with nickel or another metal effective to enhance fuel oxidation at low concentrations.

In another variation in electrode configuration, the positive air electrode and/or negative fuel electrode may include oxide overlayers for the purpose of electronic insulation and protection from physical and chemical deterioration during high temperature use. A particularly suitable family of overlayer materials comprises the lanthanum strontium cobaltates (LSC) of which $La0.8Sr0.2CoO3$ is a specific example.

If desired, the fuel cell assemblies of the invention may include a roughened interfacial layer applied to the freestanding thin electrolyte to improve electrode adhesion and electrical contact between the electrode and the electrolyte. Such interface layers, which form no part of the present invention, are preferably porous, and may be of the same composition as the electrolyte structure, if desired.

Particularly suitable for interfacial layers with zirconia electrolytes are stabilized zirconia, as described above, $CeO_2$ doped with $Y_2O_3$ or Pr, and mixtures thereof. An interfacial layer of $CeO_2$ doped with $Y_2O_3$ or Pr, or $ZrO_2$ doped with Tb could have both ionic and electronic conduction. In conjunction with the rough/porous geometry of the interfacial layer, this could lower the interfacial resistance further and allow operation at even lower temperatures. These interfacial layers do have an ohmic component to their resistance, and the thinner and denser the interface layers are, the lower this ohmic component is. For this reason the interfacial layer will desirably be less than five microns in thickness, more preferably less than two microns in thickness, and most preferably less than one micron in thickness.

Phase boundaries may be enhanced in these interface layers through infiltration with an electronically conductive phase. Typically this phase will be distributed homogeneously throughout the granular structure of the interfacial layer; it may comprise a metal, metal alloy, or cermet wherein the metal is platinum, palladium, gold, silver, and mixtures thereof. Suitable alloys include alloys with platinum, palladium, gold, silver, rhodium and other metals. Suitable cermets include zirconia, chromia, alumina, or titania combined with platinum, palladium, gold, silver, or rhodium, and well as cermets with perovskites. Mixtures of these metals with glass and glass ceramics are also suitable. The addition of such a conductive phase may be accomplished by methods known to those of ordinary skill in the art. For example, the addition of silver metal may be accomplished by infiltration with a silver nitrate solution, followed by a heat treatment to convert the nitrate to metal.

In the planar fuel cell designs of the invention, improved contact between the interconnects and the cell electrodes also help to reduce internal cell resistance. The vias themselves can provide closely spaced multiple contacts of less than 1 cm and as little as 2 mm, or added interconnect material can provide line contacts with the electrodes. The interconnects themselves not only bridge between adjacent or opposing electrodes but also act to seal the vias and separate air and fuel reservoirs within the cells. Via structures comprising regions or strips of high porosity within the electrolyte sheets, wherein the pores are infiltrated with electrically conducting materials, are also possible.

To further reduce the effects of electrode resistivity on cell internal resistance, the cells may include current conducting grids on electrode surfaces, or bonded combinations of metallic, ceramic, or cermet current conductors may be provided within one or both of the electrodes. Either of these approaches can reduce internal resistance by reducing current path lengths through the electrodes.

A large number of different electrode and cell patterns are possible when designing a fuel cell in accordance with the present invention. Cells can be arranged so as to increase performance, optimize strength, or reduce the cost and complexity of manufacture. For example, a cell can utilize both parallel and series connections between the electrodes which can increase the reliability of the device. To optimize performance, cells on the same device can be printed with differing electrode lengths and thus differing areas. Cell and electrode geometry can be chosen to make better use of fuel or fuel delivery. Electrodes can be arranged in linear rows, concentric rings, triangular wedges, or any other shape chosen so as to allow manifolding or improve performance.

The method used to construct the electrode/electrolyte structures of the invention may vary in accordance with the particular fuel cell design to be employed. In general, however, a compliant electrolyte sheet of a suitable ion-conducting ceramic material is first selected, an electrode layers are then applied to the sheet. The sheet may first be provided on one or both sides with an interfacial layer if such a layer is to be incorporated into the structure, and via hole or electrode interconnection may be provided. Electrode application can be carried out with any known process, including but not being limited to screen printing, transfer printing, vapor deposition, electroless plating, and the like. The electrodes may be applied in a single step, or multiple steps involving one or more methods to form the desired microstructure and composition can be used.

Before or after the electrodes have been provided, and before or after any supplemental electrode firing or other bonding treatments are employed, electronically conducting materials for filling the vias and forming the electrode interconnects may be applied to the electrolyte sheet. The interconnect layers may also be heat-treated or otherwise processed as necessary or desirable to remove binders, bond the interconnects and/or electrodes to the sheets, develop appropriate electrode or interconnect microstructures, or the like. The resulting electrode/electrolyte structures may then be provided with electrical leads and combined with appropriate fuel and oxidant reservoir and manifold components to construct a fuel cell of the required performance and design in accordance with conventional practice.

The invention may be further understood by reference to the following examples, which are intended to be illustrative rather than limiting.

EXAMPLE 1

Electrolyte Sheet Preparation

An electrolyte sheet for an electrode/electrolyte element useful for fuel cell fabrication is first provided. That electrolyte consists of a strong flexible sheet of sintered zirconia-3 mole % yttria ceramic, the sheet having a thickness of about 20 microns and being about 4 cm by 8 cm in size.

For this example, optional roughened surfaces are provided on the electrolyte sheet to improve adhesion and reduce electrolyte/electrode interfacial resistance for the electrodes subsequently to be applied. The roughened surfaces are provided by applying rough nano-crystalline surface layers to opposing surfaces of the electrolyte. Application is carried out by tape casting a ceramic slip onto each of the opposing surfaces of the sheet, followed by drying and then firing.

The ceramic slip used to apply the surface layers is a fluid suspension of yttria-partially stabilized zirconia in an alcohol-based vehicle containing a plasticizer and powder binder. The slip is prepared by milling, double settling with decantation, flocculation, and final dilution of a mixture of 100 g of TZ-3Y zirconia powder (Tosoh Corporation, Tokyo, Japan) in 50 g of an ethanol vehicle containing small additions of butanol, propylene glycol, water, and a dispersant.

Flocculation of the supernatant slip after final settling is achieved by adding 2 parts by weight of an ethanol-glacial acetic acid flocculant to the slip for each 100 parts by weight of remaining (suspended) zirconia. Flocculation is followed by the addition of 3.5 parts of a dibutyl phthalate plasticizer and 6 parts of a polyvinyl butyral powder binder to the flocculated slip, with further mixing over a period of several hours.

A 3:1 dilution of this slip is next carried out by means of a liquid addition of additional vehicle, plasticizer and binder in proportions substantially equivalent to those of the undiluted slip. The diluted slip is then tape-cast onto a first surface of the electrolyte sheet at a casting blade clearance of about 12 $\mu$m, and dried at 70° C. After coating the reverse side of the electrolyte sheet in the same manner, the electrolyte with dried surface coatings is fired in air to 1300° C. to sinter and bond the coatings to the electrolyte surfaces.

EXAMPLE 2

Electrode Application

Palladium-silver alloy electrodes of various compositions are applied to opposing surfaces of sample electrolyte sheets prepared as described in Example 1 above. The general procedure employed involves depositing electrodes 2.5 cm by 1 cm in area on opposite sides of the electrolyte sheet. The electrodes are applied by screen printing from printing mixtures comprising palladium-silver alloy powders and ceramic powder stabilizers combined in a conventional screen printing vehicle.

The vehicle contains TEXANOL® solvent from the Eastman Chemical Co. Kingsport, Tenn., ethyl cellulose T100 polymer from Hercules Aqualon, Hercules Incorporated, Houston, Tex., BYK-354 leveling agent from BYK-Chemie, Wesel, Germany, Anti-Terra 202 dispersant also from BYK-Chemie, and Hypermer LP4 dispersant from ICI Americas, Inc., Wilmington, Del. The solids component of the screen printing mixture consists of an alloy/ceramic powder mixture containing a 90 wt % silver/10 wt % palladium alloy powder available from Englehard Corporation, Iselin, N.J., and selected volume proportions of 3Y—ZrO2 powder from the Tosoh Corporation, Tokyo, Japan.

The electrode coatings are applied to the electrolyte surfaces by screening to a thickness sufficient to provide consolidated electrodes approximately 10–20 $\mu$m thick on opposite sides of the electrolyte after firing. After screening, each electrolyte sheet with deposited screen coatings is fired to 900° C. to consolidate and bond the coatings to the electrolyte. The electrodes arrangements in each case are characterized as "symmetric" in that the fuel electrodes (anodes) and air electrodes (cathodes) in each electrolyte-supported array are of substantially the same composition and thickness after firing.

The designations of the various electrode formulations evaluated in these fuel cell configurations are recorded in terms of the compositions of the consolidated, bonded electrode coatings, indicating silver content (weight percent in alloy), palladium content (weight percent in alloy), and ceramic (volume percent in electrode) in that order. Thus an electrode composition designated 90/10/47 contains an $Ag_{0.9}Pd_{0.1}$ alloy which incorporates 47% by volume of the stabilizing ceramic powder phase, the latter in all cases consisting of 3% yttria-partially stabilized zirconia (3YSZ). A designator "LSC" is added to the designation in cases where the electrodes include protective ceramic overcoatings of lanthanum strontium cobaltate ($La_{0.8}Sr_{0.2}CoO_3$).

EXAMPLE 3

Fuel Cell Electrode Performance Testing

Impedance spectroscopy is used to study the interface resistance in air of selected fuel cell electrode pairs provided in accordance with Example 2 above. Measurements involve 4-point, two-electrode measurements at applied voltages of 20 mV in the frequency range from 1 MHz to 0.1 Hz using Solartron 1260 impedance measurement equipment. Silver wires are attached to the electrodes using a silver palladium paste. In each case, the electrode interface resistance, $R_i$, is taken as the difference between the low and high frequency intercepts with the real axis on a Nyquist impedance plot.

Impedance spectra are first taken from a symmetric sample incorporating opposing 10 $\mu$m electrodes of 90/10/47 composition on electrolyte sheet prepared as in Example 1. An interface resistance of 0.1 ohm-$cm^2$ on testing at 725° C. in air is recorded. This exceptionally low interface resistance is important for achieving high power densities (>0.5 W/cm) in solid oxide fuel cells.

Thermal cycling impedance spectra are next taken from a sample of the above design as well as two additional symmetric electrode sample designs deposited on electrolyte sheets prepared in accordance with Example 1 above. The three different electrode designs tested are: opposing 10 $\mu$m-thick $Ag_{0.9}Pd_{0.1}$ electrodes, designated 90/10/47 10 $\mu$m; opposing 20 $\mu$m-thick $Ag_{0.9}Pd_{0.1}$ electrodes designated 90/10/47 20 $\mu$m; and opposing 10 $\mu$m-thick $Ag_{0.9}Pd_{0.1}$, electrodes with an LSC overcoating, designated 90/10/27/LSC.

Figure 2:
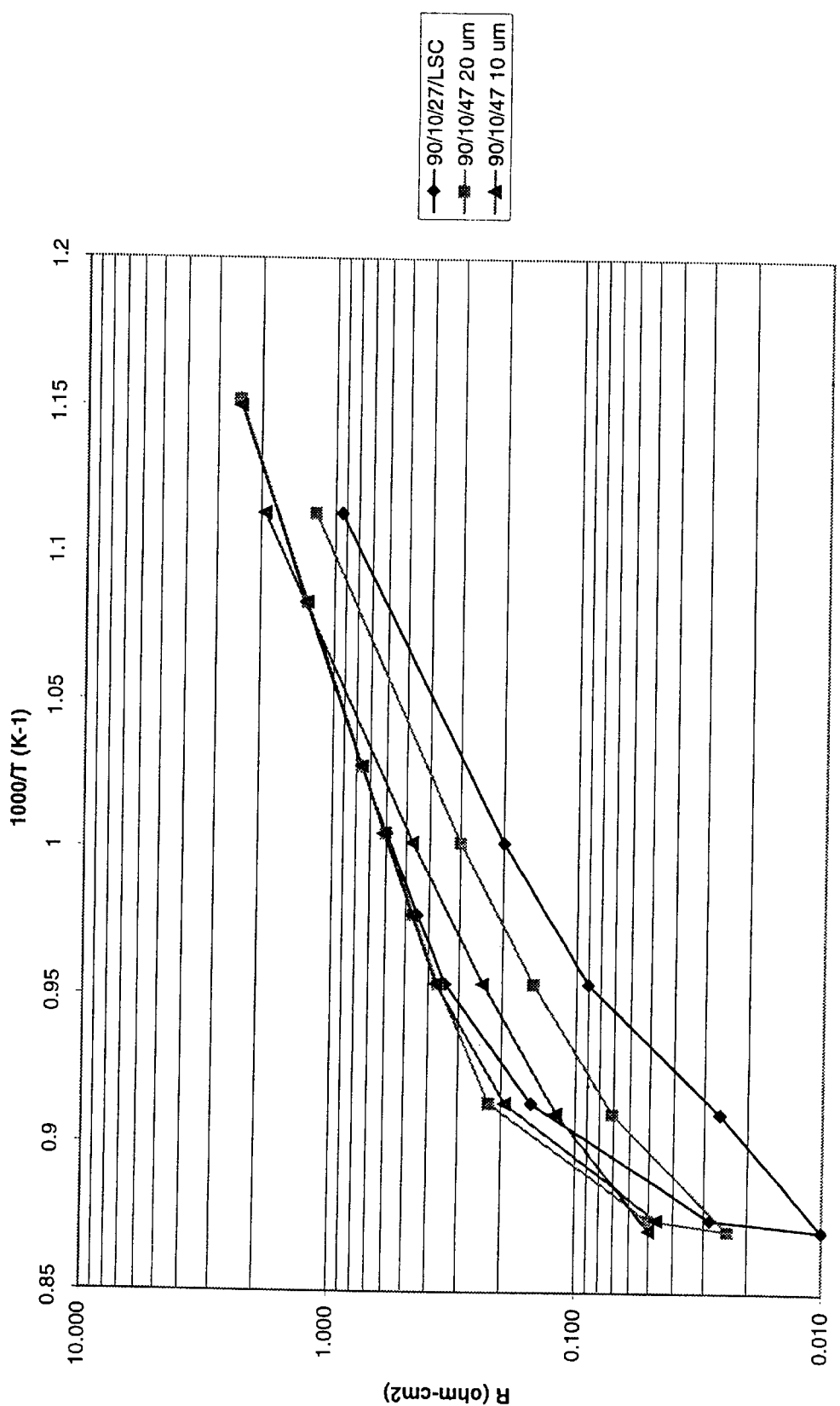
FIG. 2 shows an electrode interface resistance comparison for several electrode compositions provided in accordance with the invention.

FIG. 2 of the drawing compares $R_i$ values for these three samples as measured during an initial electrode heating/cooling cycle. The impedance data for each sample are collected as the samples is heated from ambient to 900° C., annealed at that temperature for one hour, and then cooled to room temperature.

As is evident from a study of FIG. 2, certain variations in interface resistance on thermal cycling appear to be associated with electrode thickness alone. Thus the thicker 09/10/47 20 $\mu$m electrodes exhibit a lower impedance after annealing and over the cool-down interval than the thinner 90/10/47 10 $\mu$m electrodes.

It is thought that the additional surface area in the thick electrode reduces adsorption resistance. At the same time, electrode volume well away from the electrode/electrolyte interface may be helping to reduce the interface resistance. In any case calculations indicate that the conductivity of oxygen species through the bottom 10 $\mu$m of electrode thickness is exceptionally high.

Fast surface diffusion also favorably impacts electrode performance in these composite compositions. High silver alloy surface area provides for fast ion conduction, and ceramic phase composition may therefore selected to enhance other properties such as electronic conductivity, adsorption activity and interfacial energy (affected by ceramic adherence to the silver alloy phase). Good silver-ceramic wetting in these systems maintains the microstructural integrity necessary for long-term stability in these electrode systems.

Electrodes incorporating LSC overlayers also show a significant drop in interface resistance on cycling. This is attributed to reduced adsorption resistance, likely caused by the presence of high surface area submicron oxide particles at the air/electrode interface. The inclusion of ceramic phases with appreciable electronic conductivity such as lanthanum strontium cobaltate or molybdate is expected to improve long term electrode durability by minimizing loss of electrical contact between metal grains. These materials are wet by and may infiltrate the silver alloy electrode to some extent; therefore they may be used as protective overlayers to further inhibit grain growth and maintain electrode surface area.

EXAMPLE 4

Electrode Aging

An important issue for electrodes containing silver is long-term microstructural stability. One aging study (Badwal et al., *J. Electroanal. Chem.*, 168:363(1984)), performed with sputtered silver films on yttria-stabilized zirconia, showed a ten-fold increase in interface resistance on aging at 600° C. for 50 hours. SEM photos showed silver beading due to silver mass movement and agglomeration, attributed in part to poor wetting of the silver to the zirconia substrate.

Figure 3:
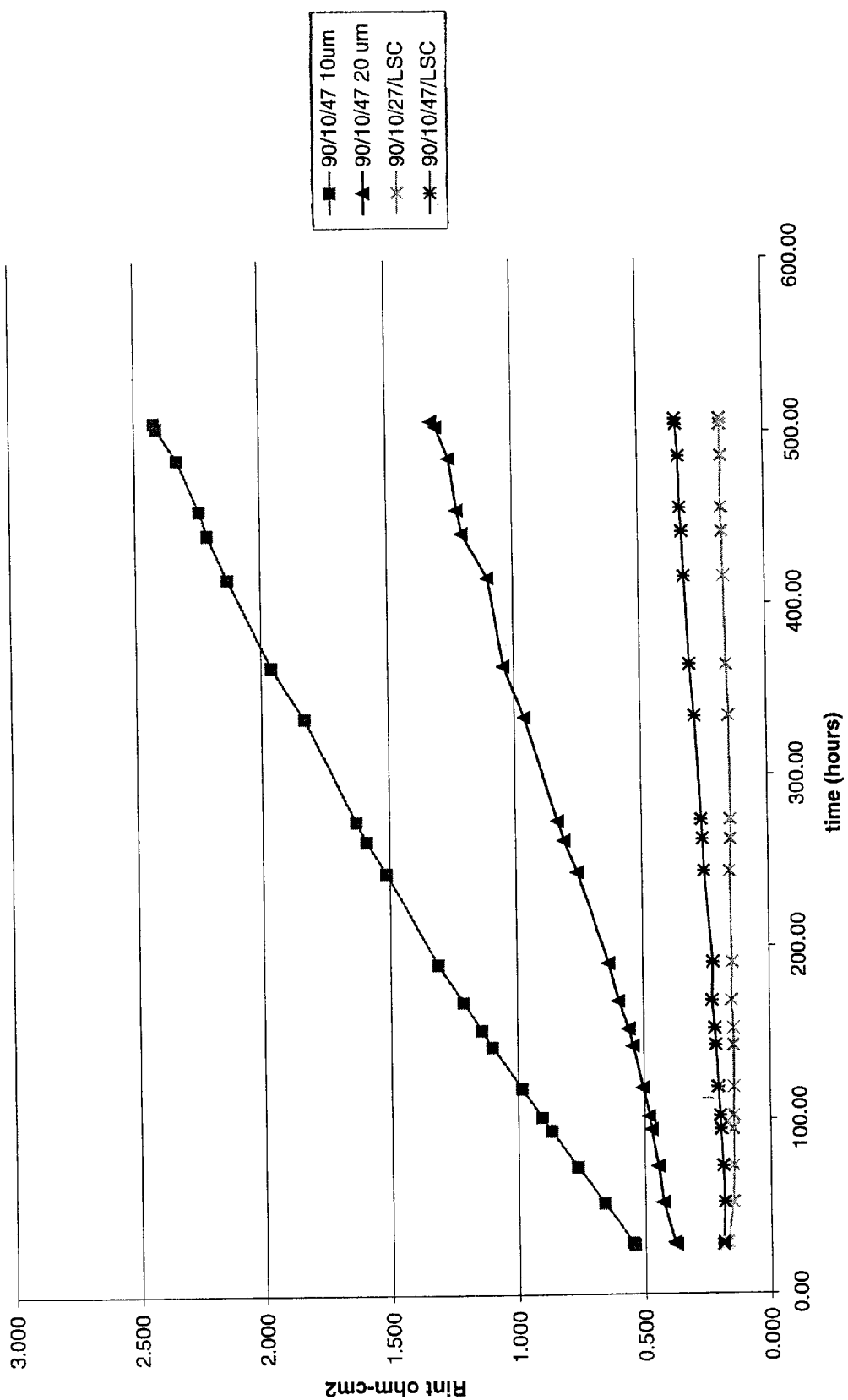
FIG. 3 shows interface resistance aging data for a number of different electrode compositions provided in accordance with the invention.

The composite electrodes of the invention exhibit high-temperature aging behavior significantly better than electrodes of silver alone. FIG. 3 of the drawing plots interface resistance as a function of aging time at 725° C. for four different electrode compositions of composite ceramic/silver alloy type. Included in FIG. 3 are three electrode assemblies like those tested in Example 3 above, as well as a fourth electrode/electrolyte assembly, designated 90/10/47/LSC, incorporating the same electrolyte as the other three samples but supporting opposing 10 $\mu$m-thick $Ag_{0.9}Pd_{0.1}$ electrodes comprising a 47% (volume) ceramic powder addition protectively coated with LSC. Aging times for the assemblies ranged up to 500 hours in length.

The improved aging results shown in FIG. 3 are primarily attributable to the presence of a grain-growth inhibiting ceramic component in the electrodes tested, although yttria-stabilized zirconia is likely not an optimum grain-growth inhibitor for this particular silver alloy system. Of particular interest is the fact that the designs incorporating stabilizing LSC overlayers demonstrated significantly smaller increases in $R_i$ than designs omitting those layers. These results indicate that the addition of an appropriate protective or stabilizing overlay to the electrode structure can effect a substantial improvement in electrode aging behavior.

Based on the foregoing evaluations, electrode designs preferred for use in the fuel cells of the invention will incorporate high surface area ceramic phases in sufficient proportions (generally at least about 10 volume %) to significantly reduce adsorption resistance, and to inhibit alloy grain growth to an extent sufficient to maintain alloy surface area. The ceramic phase may be mixed with the alloy, used as an overcoating material, or both.

The ceramic phase need not provide ionic conductivity since oxygen mobility within the silver alloy phase is high. Instead, additives that are wet by the metal alloy at high temperatures and that maintain good electronic conductivity at those temperatures will be preferred. Ceramic additives other than zirconia-based ceramics that offer good electronic conductivity include lanthanum chromites, rhodates and ruthenates as well as lanthanum strontium cobaltates and molybdates.

EXAMPLE 5

Solid Oxide Fuel Cell Assembly

An electrode/electrolyte composite prepared as described in Examples 1 and 2 is incorporated into a simple fuel cell assembly for evaluating fuel cell performance. The electrodes used are of 90/10/47 composition and are 10 $\mu$m in thickness. Prior to constructing the cell, the electrode selected to function as the anode of the cell is first treated to enhance its catalytic activity toward hydrogen dissociation. For that purpose, the anode is infiltrated with a nickel precursor in the form of a 0.5 M solution of nickel nitrate by repeated (10×) applications of the nitrate solution to the anode with a cotton swab. Drying between applications is accomplished by placing the sample on a hot plate at 350° C.

To configure the fuel cell, silver wire leads are first attached to the electrodes using silver paste and a simple manifold is then constructed. A fuel reservoir is formed by edge-sealing the electrolyte composite to a stainless steel backing sheet to form an envelope on the anode side of the composite. The envelope has fuel inlet and outlet ports at opposing ends and a fuel gas feed tube sealed into the inlet port. Edge-sealing of the envelope and inlet tube is by means of Duralco 230 stainless steel ceramic composite paste from the Cotronics Corporation of Brooklyn, N.Y.

Alumina felt is inserted into the fuel reservoir outlet to act as a exhaust restriction and the fuel cell assembly is then inserted into a furnace with the feed tube connected to a source of hydrogen for testing. In this configuration, the furnace chamber forms the air or oxidant reservoir of the fuel cell with furnace air furnishing the necessary oxygen to the exposed fuel cell cathode.

To test the cell, the furnace is heated while hydrogen fuel is supplied to the anode within the fuel reservoir envelope through the feed tube. At the same time, the cathode or air electrode is exposed to a convective flow of ambient air in the furnace, with a thermocouple cemented directly to the air side of the electrolyte providing an accurate indication of fuel cell operating temperature.

Fuel cell power output is a function of the operating temperature of the cell as well as the current at which the cell is operated. At any selected operating temperature, the cell will have a maximum power density at some current between zero and its maximum current output, depending on the voltage-current characteristics of the device. For fuel cells provided in accordance with this example, typical maximum power densities of about 0.46 $W/cm^2$ at 725° C., 0.57 $W/cm^2$ at 740° C., and 0.69 $W/cm^2$ at 780° C. are observed using pure hydrogen as the fuel. The power density of 0.46 $W/cm^2$ observed at the lowest operating temperature is at a cell voltage of about 0.5 volts and a current density of about 0.92 $A/cm^2$. The average total internal resistance of the cell is about 0.54 ohm-$cm^2$, with impedance measurements taken on the cell indicating an interface resistance averaging less than 0.1 ohm-$cm^2$ at each of the electrodes at this temperature.

EXAMPLE 6

Fuel Cell with Electrode Array

Fuel cell voltages for individual cells of this design on the order of 1 volt. The operating voltage of these devices can be increased as needed through the deposition of connected arrays of electrodes on the electrolyte sheet. A cell incorporating such arrays can be provided as follows.

A green (unfired) electrolyte sheet about 13 cm in length and 10 cm in width composed of 3% yttria-stabilized zirconia is formed by tape-casting a zirconia slip onto a fluorocarbon carrier sheet to a thickness sufficient to form a sheet 29 μm in thickness after oven drying at 70° C. After tape casting but prior to drying, a temporary acrylic support coating of about 5 μm thickness is applied to the top of the zirconia sheet from a solution of methyl methyacrylate-ethyl methacrylate in an ethyl acetate solvent.

After drying, the zirconia sheet and support coating are separated from the fluorocarbon carrier sheet and rows of via holes are punched through the green zirconia sheet and acrylic support coating using a tungsten carbide punch. The holes are arranged in 9 rows spaced 1.1 cm apart, each row comprising 40 holes about 150 μm in diameter spaced 2 mm apart. The green sheet is then fired to 1430° C. for 2 hours to provide a strong flexible electrolyte sheet about 22 μm thick with vias about 115 μm in diameter.

Opposing arrays of composite zirconia/silver-palladium alloy electrodes separated by gaps of uncoated electrolyte sheet are next printed on both sides of the sheet utilizing the procedures and electrode printing formulations described above in Example 2. The electrode composition applied is a 90/10/47 composition containing 53% by volume of a silver 10% palladium alloy and the remainder 3Y—ZrO2 powder, each separate electrode segment being about 8 cm in length across the width of the electrolyte sheet and 8 mm in width. The electrode segments are fired to 900° C. after printing to consolidate and bond them to the electrolyte sheet. Thereafter, the electrode segments on the fuel or anode side of the sheet are catalyzed to enhance fuel oxidation efficiency by repeated infiltration with a nickel nitrate solution as described in Example 5.

After the electrodes have been applied and fired, the via holes are filled with a gas-impermeable electronically conductive interconnect material consisting of a 30% palladium 70% silver alloy powder dispersed in a cellulosic vehicle. This interconnect material is applied in a manner such that it bridges each electrode segment on the cathode side of the sheet to the next succeeding electrode segment on the anode side of the sheet. The sheet with filled vias is then fired to 900° C. to consolidate and bond the interconnect material to the composite structure.

FIG. 1B of the drawing provides a schematic side elevational view of the resulting arrayed electrode/electrolyte fuel cell device with its interconnect structure. As shown in that FIG., the interconnections between the cathode segments and anode segments are such as to form an array of electrochemical cells in series, with voltage building from cell to cell from one end to the other of the electrode array.

The device made as described is tested for electrical properties by the application of hydrogen to the anode side and air to the cathode side of the structure. The device has a peak power output of about 13.5 W, yet retains sufficient flexibility and compliance to maintain physical and electrical integrity when rapidly cooled from 600° C. to room temperature over a 10 second cooling interval.

Although the invention has been described in detail for the purpose of illustration, it is understood that such detail is solely for that purpose, and variations can be made therein by those skilled in the art without departing from the spirit and scope of the invention which is defined by the following claims.

We claim:

1. A compliant electrode/electrolyte structure for a solid oxide fuel cell comprising a thin flexible solid oxide electrolyte sheet incorporating a plurality of positive air and negative fuel electrodes bonded to opposing sides of the electrolyte sheet, wherein:

the electrolyte sheet is a flexible sintered ceramic sheet having a thickness not exceeding 45 microns composed of stabilized or partially stabilized zirconia, and the electrodes are electrically connected in series, parallel, or a combination thereof by means of vias through the electrolyte sheet filled with electronically conducting material.

2. A structure in accordance with claim 1 wherein the vias are filled with metallic conducting material.

3. A structure in accordance with claim 1 wherein the vias are filled with a metallic conducting material selected from the group of semi-precious and precious metals and metal alloys.

4. A structure in accordance with claim 1 wherein the vias are filled with a metallic conducting material comprising at least one metal selected from the group consisting of silver, gold, platinum, palladium, rhodium and alloys thereof.

5. A structure in accordance with claim 1 wherein the electrolyte sheet has a thickness between 5 and 20 microns.

6. A structure in accordance with claim 1 wherein the vias have diameters no greater than 750 microns.

7. A structure in accordance with claim 1 wherein the electrodes have a thickness in the range of 1–20 microns.

8. A structure in accordance with claim 1 wherein the electrodes comprise a conductive metal phase and a ceramic phase.

9. A structure in accordance with claim 8 wherein the conductive metal phase is silver or silver alloy.

10. A structure in accordance with claim 8 wherein the ceramic phase is a polycrystalline ceramic selected from the group consisting of stabilized zirconia, partially stabilized zirconia, stabilized hafnia, partially stabilized hafnia, mixtures of zirconia and hafnia, ceria with zirconia, bismuth with zirconia, gadolinium, germanium, and mixtures thereof.

11. A structure in accordance with claim 8 wherein the ceramic phase is selected from the group consisting of partially stabilized zirconias or stabilized zirconias that are doped with a stabilizing additive selected from the group consisting of the oxides of Y, Ce, Ca, Mg, Sc, Nd, Sm, Eu, Gd, Tb, Dy, Ho, Er, Tm, Yb, Lu, In, Ti, Sn, Nb, Ta, Mo, and W and mixtures thereof.

12. A structure in accordance with claim 1 having a total thickness not exceeding 150 microns.

13. A structure in accordance with claim 1 wherein the electrolyte sheet has a composition comprising 3–10 mole % yttria and 90–97 mole % zirconia.

14. A structure in accordance with claim 1 wherein the electrolyte sheet consists of a zirconia ceramic containing 3–6 mole % yttria.

15. A fuel cell apparatus containing at least one compliant electrode/electrolyte structure formed of an array of positive air electrodes and negative fuel electrodes disposed on opposing sides of a flexible solid oxide electrolyte sheet, wherein the electrolyte sheet is a sintered ceramic sheet having a thickness not exceeding 45 microns, and wherein the positive and negative electrodes are electrically connected in series, parallel, or a combination thereof by means of vias filled with electronically conducting material traversing the electrolyte sheet.

16. Apparatus in accordance with claim 15 wherein the vias are filled with an electrical conductor selected from the group consisting of semi-precious and precious metals and metal alloys.

17. Apparatus in accordance with claim 15 operating at a temperature of less than 850° C.

18. Apparatus in accordance with claim 15 wherein the positive and negative electrodes comprise a conductive metal phase and a ceramic phase and are electrically connected by conductors traversing vias in the electrolyte sheet.

19. Apparatus in accordance with claim 15 having a total single-cell internal resistance below 1 ohm-cm$^2$.

20. Apparatus in accordance with claim 15 wherein the electrolyte sheet has a thickness in the range of 5–45 microns and is composed of a polycrystalline ceramic having a composition selected from the group consisting of partially stabilized zirconias or stabilized zirconias that are doped with a stabilizing additive selected from the group consisting of the oxides of Y, Ce, Ca, Mg, Sc, Nd, Sm, Eu, Gd, Tb, Dy, Ho, Er, Tm, Yb, Lu, In, Ti, Sn, Nb, Ta, Mo, and W and mixtures thereof.

21. Apparatus accordance with claim 15 wherein the negative fuel electrode contains nickel.

22. Apparatus accordance with claim 15 wherein at least one of the positive air electrode and the negative fuel electrode further comprise an oxide overlayer.

23. Apparatus accordance with claim 22 wherein the oxide overlayer is composed of lanthanum strontium cobaltate.

24. A solid oxide fuel cell comprising:
a plurality of positive air electrodes and negative fuel electrodes, both the positive and negative electrodes having a composition comprising a conductive metal phase and a ceramic phase;
a compliant electrolyte sheet interposed between the positive air electrodes and negative fuel electrodes, the positive air electrodes being bonded to a first side of the electrolyte sheet and the negative fuel electrodes being bonded to a second side of the electrolyte sheet; the positive and negative electrodes being in opposing positions across the electrolyte sheet to form a plurality of electrochemical cells on the sheet; and
the plurality of cells being connected in electrical series, parallel, or a combination of series and parallel by means of cell interconnects contacting the electrodes and traversing a plurality of vias formed in the electrolyte sheet.

25. A method of making an electrode/electrolyte structure for a solid oxide fuel cell comprising the steps of:
providing a sintered compliant ceramic electrolyte sheet of a thickness not exceeding 45 microns comprising a plurality of vias therethrough;
forming a plurality of cathode segments on a first side of the electrolyte sheet and a plurality of anode segments in opposition to the cathode segments on a second side of the electrolyte sheet; and
filling the vias with an electronically conducting material to form electrically conducting interconnects traversing the vias from the first side to the second side, each interconnect being in contact with at least one cathode segment on the first side and at least one anode on the second side of the sheet.

* * * * *